United States Patent [19]

Rogers et al.

[11] Patent Number: 4,597,891
[45] Date of Patent: Jul. 1, 1986

[54] LIQUID CRYSTAL COMPOSITIONS AND DEVICES AND NOVEL COMPOUNDS

[75] Inventors: Howard G. Rogers, Weston, Mass.; Russell A. Gaudiana, Merrimack, N.H.; Cynthia B. McGowan, Stoneham, Mass.; Kenneth S. Norland; Ronald J. Sahatjian, both of Lexington, Mass.

[73] Assignee: Polaroid Corporation, Cambridge, Mass.

[21] Appl. No.: 616,975

[22] Filed: Jun. 4, 1984

[51] Int. Cl.$^4$ .......................... C02F 1/13; C09K 3/34; C07C 403/00
[52] U.S. Cl. ................................ 252/299.1; 350/349; 546/37
[58] Field of Search ........................ 546/37; 350/349; 252/299.1

[56] References Cited

U.S. PATENT DOCUMENTS

| | | | |
|---|---|---|---|
| 2,890,222 | 6/1959 | Eckert et al. | 546/37 |
| 3,043,843 | 7/1962 | Koch | 546/37 |
| 3,554,776 | 1/1971 | Gerson et al. | 546/37 |
| 4,378,302 | 3/1983 | Aftergut et al. | 252/299.1 |
| 4,384,107 | 3/1983 | Rogers et al. | 528/183 |

FOREIGN PATENT DOCUMENTS

| | | | |
|---|---|---|---|
| 47027 | 3/1982 | European Pat. Off. | 252/299.1 |
| 68427 | 1/1983 | European Pat. Off. | 252/299.1 |
| 1569841 | 8/1970 | Fed. Rep. of Germany | 546/37 |
| 2851513 | 6/1980 | Fed. Rep. of Germany | 252/299.1 |
| 3016765 | 11/1981 | Fed. Rep. of Germany | 546/37 |
| 3145711 | 5/1983 | Fed. Rep. of Germany | 252/299.1 |
| 3148206 | 6/1983 | Fed. Rep. of Germany | 252/299.1 |
| 42-9790 | 5/1967 | Japan | 546/37 |
| 57-167352 | 10/1982 | Japan | 252/299.1 |
| 59-223786 | 12/1984 | Japan | 252/299.1 |
| 60-26084 | 2/1985 | Japan | 252/299.1 |
| 60-26085 | 2/1985 | Japan | 252/299.1 |
| 58863 | 1/1970 | Poland | 246/37 |

*Primary Examiner*—Teddy S. Gron
*Attorney, Agent, or Firm*—Gaetano D. Maccarone

[57] ABSTRACT

There are described novel perylene dyes which have at least one, and preferably two, substituted twisted biphenylene radicals. The substituted biphenylene radicals include substituents which confer a non-coplanar molecular configuration about the long axis of the dye molecule. The dyes are soluble in various liquid crystal materials and exhibit a high order parameter in solutions of liquid crystal material. Also disclosed are liquid crystal compositions and liquid crystal devices.

15 Claims, No Drawings

LIQUID CRYSTAL COMPOSITIONS AND DEVICES AND NOVEL COMPOUNDS

BACKGROUND OF THE INVENTION

The application relates generally to novel perylene dye compounds and, more specifically, to such dye compounds which are useful in liquid crystal guest-host applications and to liquid crystal compositions and devices.

It is known in the art to use dyes, including perylene dyes, in conjunction with liquid crystalline materials to obtain improved color displays in liquid crystal display devices. In liquid crystal guest-host systems, a "guest" dye is dissolved in the "host" liquid image-forming medium in the display device. The guest dyes, which may be used alone or in combination with other dyes to achieve a desired color for the display, desirably should possess properties such as dichroism, high extinction coefficient, relatively high solubility in the liquid crystal material and high order parameter.

The solubility of the dye(s) in the liquid crystal material must be such that the relatively thin liquid crystal layer in the display device possesses adequate absorption in one of the oriented states of the dye(s). Order parameter is a quantitative measure of the degree of molecular order or alignment in a given system. High order parameter is promoted by dyes with elongated shape having a large ratio of molecular length to width, similar to the shape of the molecules of the liquid crystal host material. To insure an elongated shape the molecules should also have a rigid structure.

The brightness and contrast of a liquid crystal display device are both related to the order parameter, normally designated S, of the dye, where $S=(A_\parallel - A_\perp)/(A_\parallel + 2A_\perp)$, $A_\parallel$ is the light absorption of the dye measured with a polarizer parallel to the nematic director of the liquid crystal host at the wavelength of maximum absorption and $A_\perp$ is the light absorption of the dye measured with the polarizer perpendicular to the nematic director. Desirably, the order parameter of the dyes should be as high as possible for example, at least 0.60 and preferably higher, in order to achieve a desired contrast ratio while at the same time allowing the fabrication of a liquid crystal display device having a reasonable brightness parameter. Thus, there is a continuing need in the art for dyes which are soluble in liquid crystal materials, at least in the amount typically employed to provide a suitable display device, e.g., up to about 1% or more, and which have a relatively high order parameter.

SUMMARY OF THE INVENTION

It is therefore the object of this invention to provide novel perylene dye compounds.

It is another object to provide perylene dyes which include at least one, and preferably two, substituted biphenylene radicals.

It is a further object to provide perylene dyes which are useful in liquid crystal applications.

It is a still further object to provide perylene dyes which are soluble in liquid crystal materials.

It is yet another object to provide perylene dyes which exhibit a high order parameter in solutions of liquid crystal materials.

Still another object is to provide novel liquid crystal compositions comprising liquid crystal material and one or more of such perylene dyes.

It is another object to provide liquid crystal display devices which include a layer of such liquid crystal compositions.

BRIEF SUMMARY OF THE INVENTION

It has been found that by attaching one and preferably two substituted biphenylene radicals, as will be defined in detail below, to an appropriate dye chromophore, it is possible to provide dye compounds which are soluble in liquid crystal materials and which exhibit a high order parameter in solutions of liquid crystal materials. The novel perylene dye compounds of the invention are represented by the formula

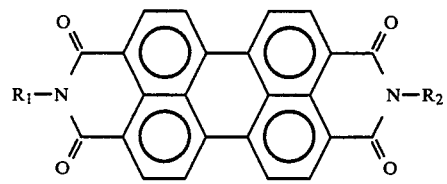

wherein $R_1$ can be hydrogen; alicyclic such as cyclopentane, cyclohexane, etc.; straight chain or branched alkyl, preferably having from 1 to 10 carbon atoms; aryl such as phenyl or phenyl substituted with substituents such as straight chain or branched alkyl, alkoxy, each preferably having from 1 to 10 carbon atoms; and others such as those described below herein for substituent W;

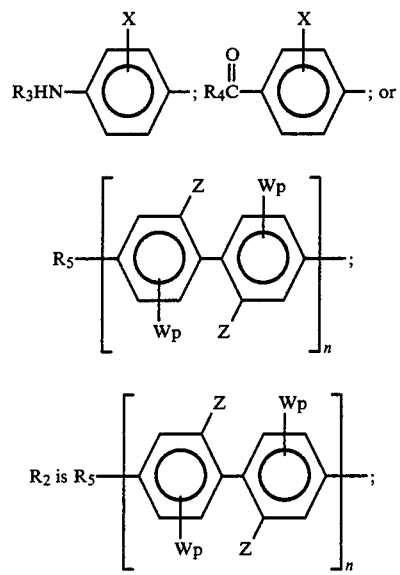

$R_3$ can be hydrogen; straight chain or branched alkyl, preferably having from 1 to 10 carbon atoms; aryl such as phenyl, biphenyl, or phenyl or biphenyl substituted with any of the substituents described below for substituent W; or

$R_4$ can be straight chain or branched alkyl, preferably having from 1 to 10 carbon atoms; alkoxy, preferably having from 1 to 10 carbon atoms; aryl such as phenyl, biphenyl or phenyl or biphenyl substituted with any of the substituents described below for substituent W; or $NHR_7$;

$R_5$ can be hydrogen; halogen (e.g., fluoro, chloro, bromo, iodo); straight chain or branched alkyl, preferably having from 1 to 10 carbon atoms; alkoxy, preferably having from 1 to 10 carbon atoms; aryl such as phenyl; —CN; —$COR_7$; —$COOR_7$; —$NHR_7$; —$NO_2$;

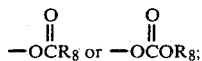

$R_6$ can be hydrogen; straight chain or branched alkyl, preferably having from 1 to 10 carbon atoms; alkoxy, preferably having from 1 to 10 carbon atoms; or aryl such as phenyl;

$R_7$ can be hydrogen, straight chain or branched alkyl, preferably having from 1 to 10 carbon atoms; or aryl such as phenyl or biphenyl or phenyl or biphenyl substituted with any of the substituents described below for W;

$R_8$ can be straight chain or branched alkyl, preferably having from 1 to 10 carbon atoms; or aryl such as phenyl or biphenyl or phenyl or biphenyl substituted with any of the substituents described below for W;

X can be hydrogen; halogen; straight chain or branched alkyl, alkoxy, each preferably having from 1 to 10 carbon atoms; or fluoroalkyl e.g. trifluoromethyl, preferably having from 1 to 10 carbon atoms;

Z can be any substituent other than hydrogen such as, for example, halogen; straight chain or branched alkyl, preferably having from 1 to 10 carbon atoms; fluoroalkyl, e.g., trifluoromethyl, preferably having from 1 to 10 carbon atoms; alkoxy, preferably having from 1 to 10 carbon atoms, e.g., methoxy, ethoxy, etc.; nitro; cyano; hydroxy; hydroxyalkyl, preferably having from 1 to 10 carbon atoms, e.g., hydroxymethyl, hydroxyethyl; thioalkyl, preferably having from 1 to 10 carbon atoms, e.g., thiomethyl; carboxy; sulfonic acid esters; sulfinic acid esters; carboxamide; sulfonamide; amino and carbonyl;

W can be hydrogen or a substituent other than hydrogen such as halogen, straight chain or branched alkyl, preferably having from 1 to 10 carbon atoms; fluoroalkyl such as trifluoromethyl, preferably having from 1 to 10 carbon atoms; alkoxy, preferably having from 1 to 10 carbon atoms; nitro; cyano; hydroxy; hydroxyalkyl, preferably having from 1 to 10 carbon atoms (e.g., hydroxymethyl, hydroxyethyl); thioalkyl, preferably having from 1 to 10 carbon atoms (e.g. thiomethyl); carboxy, sulfonic acid esters; sulfinic acid esters; carboxamide; sulfonamide; amino and carbonyl;

n is 1 or 2; and p is an integer of from 1 to 3.

In the preferred dyes of the invention, Z is —$CF_3$. In addition to the improved solubility characteristics provided by the biphenylene radical which is "twisted", in part at least due to the presence of the substituent Z, it has been found that when Z is —$CF_3$, the compounds have even more enhanced solubility characteristics.

As is evident from the foregoing disclosure, the nature of the substituents W and Z can vary widely, consistent with the provision of a biphenylene radical having a non-coplanar molecular configuration. As used herein, the expression "non-coplanar molecular configuration" refers to a molecular configuration whereby the two aromatic nuclei of the biphenylene radical are in different planes.

While applicants do not wish to be bound by precise theory or mechanism in explanation of the properties observed for the dyes in liquid crystal compositions, it is believed that the solubility and high order parameter of the dyes in such compositions is related to the non-coplanarity conferred or promoted by the presence of substituents Z and W on the biphenylene radicals. It is believed that the ortho-positioning of the substituent Z on the interbonded nuclei of the biphenylene radical materially reduces coplanarity. This non-coplanar conformation reduces inter-molecular forces of attraction between dye molecules, thus enhancing solubility.

Thus, the nature of substituents Z and W should be such as to provide the biphenylene radicals with a non-coplanar configuration as previously described. Such configuration will in part be determined by the size and nature of the Z substituents on the aromatic nuclei of the biphenylene radical and upon the number and positioning of any other non-hydrogen substituents as may be substituted on the aromatic nuclei. For example, where the interbonded aromatic nuclei contain large or bulky substituents Z, such as trifluoromethyl groups, the desired condition of non-coplanarity is more readily realized. Similarly, where the Z substituents are relatively small, such as chloro groups, an additional non-hydrogen W substituent at the ortho position of each nucleus can increase the desired non-coplanarity. Preferably, each W is hydrogen and each p is 3.

DESCRIPTION OF THE PREFERRED EMBODIMENTS

Preferred perylene dyes according to the invention are represented by the formulas

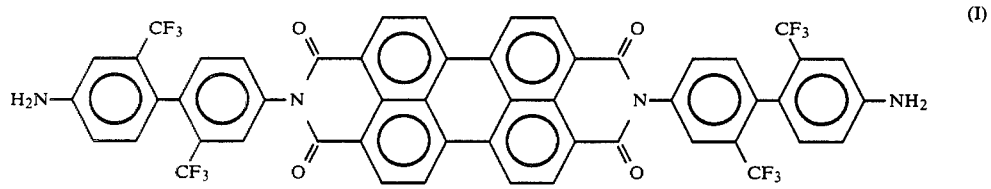

(I)

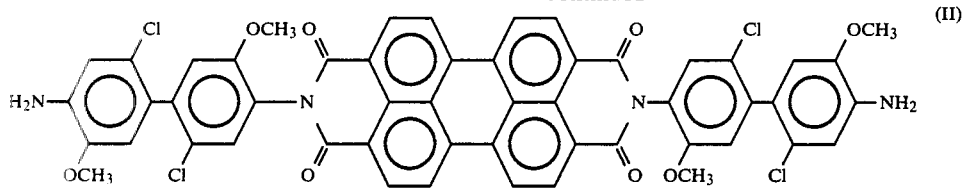

The dye compounds of the invention may be prepared by reactions which are known in the art. Generally, symmetrical dyes where $R_1$ and $R_2$ are the same, can be prepared by dissolving one equivalent of 3,4,9,10-perylenetetracarboxylic acid dianhydride and from 15–20 equivalents of the appropriate biphenyl in a solvent such as freshly distilled N-methylpyrrolidone (about 125 ml NMP/mmole of anhydride) containing zinc acetate (about 100 mg/125 ml NMP) and refluxing for 6–10 hours. After cooling, the reaction mixture can be poured into water and the resulting precipitate collected, purified and dried. Unsymmetrical perylenetetracarboxylic diimides according to the invention can be prepared by selectively reacting one anhydride group of the dianhydride with a first amine followed by reaction of the second anhydride group with a second amine according to the technique disclosed by Y. Nagao et al., Chem. Letters, 1979, pp 151–154. It will be apparent that perylenetetracarboxylic dianhydride can be condensed with an amine to form perylenetetracarboxylic monoanhydride monoimide which can then be further reacted with a twisted biphenyl amine to form the unsymmetrical diimide where one nitrogen is subtituted with hydrogen or an alkyl group and the other nitrogen is substituted with the twisted biphenyl group.

The perylene dyes of the invention can be utilized in combination with any liquid crystal material in which they are soluble and such "guest-host" liquid crystal compositions may be utilized in any liquid crystal device such as display devices and the like. In various of these applications one or more of the perylene dyes may be used in combination with other dyes, modifiers or adjuvants. Thus, it is possible to use one or more of the perylene dyes of the invention in a liquid crystal display in order to obtain a desired color for the display. In a preferred embodiment, one or more of the perylene dyes of the invention are used in combination with nematic liquid crystal material.

In guest-host liquid crystal compositions according to the invention, the amount of dye present is not critical as long as the dye is soluble in the host liquid crystal material. Generally, the liquid crystal compositions of the invention will include from about 0.05% to about 1% of the guest perylene dye(s), based on the weight of the liquid crystal host material and preferably, from about 0.1% to about 0.5% by weight. Routine scoping tests can be carried out to determine the maximum solubility of any particular dye and/or the amount required for maximum absorption as well as the amount required in any particular instances to provide the desired performance characteristics for the device in which the composition is to be utilized. Generally, the amount of guest dye will be such as to provide the desired color characteristics for the device, either as a single perylene dye, or a combination of more than one perylene dye or a combination of one or more such perylene dyes with other dyes.

As mentioned previously, any conventional liquid crystal material can be used in combination with the perylene dyes of the invention including nematic liquid crystal materials of positive or negative dielectric anisotropy, cholesteric liquid crystal materials of positive or negative dielectric anisotropy and mixtures thereof, i.e., mixtures of nematic liquid crystal material with cholesteric liquid crystal material, and which can be further modified by the inclusion of other optically active materials.

Typical suitable host liquid crystal materials in the compositions of the invention include, for example, E7 (a nematic liquid crystal of the biphenyl type), E63 (a nematic biphenyl-terphenyl mixture having a higher clearing point than E7), PCH 1221 (a nematic phenylcyclohexane), all available from EM Chemicals, Hawthorne, N.Y.; and TN 570 (a nematic liquid crystal of the biphenyl type) and TN 653 (a nematic biphenyl-pyrimidine mixture) available from Hoffmann-LaRoche Co., Nutley, N.J.

A preferred liquid crystal display device according to the invention comprises a layer of a guest-host liquid crystal composition including at least one perylene dye of the invention and a display cell of the type disclosed and claimed in copending, commonly assigned application Ser. No. 564,753, filed Dec. 22, 1983. Generally, the display cell includes a substantially transparent polymeric layer, a polarizing layer, a protective layer, a transparent electrode layer and an alignment layer.

The invention will now be described further in detail with respect to specific preferred embodiments by way of examples, it being understood that these are illustrative only and the invention is not intended to be limited to the materials, conditions, process parameters, etc. recited therein. All parts and percentages are by weight unless otherwise stated.

EXAMPLE I

Activated copper (45 g) was added to a solution of 2-bromo-5-nitro-benzotrifluoride (50 g) in 100 ml of dimethylformamide and the mixture refluxed for 5 hours. The cooled mixture was poured into excess water and the resulting brown precipitate collected by filtration, washed with water and dried. Chromatography over silica gel gave 25 g (71% yield) of

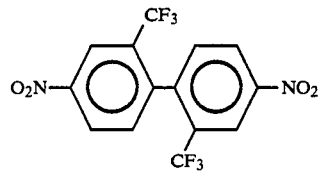

2,2'-bis(trifluoromethyl)-4,4'-dinitro-1,1'-biphenyl, recrystallized as shiny yellow prisms from ether, m.p. 138°–140° C.

$C_{14}H_6F_6N_2O_4$ requires 44.21%C, 1.58%H, 7.37%N and 30.1%F. Elemental analysis found 44.12%C, 1.79%H, 7.30%N and 28.9%F.

Stannous chloride dihydrate (8 g) was added to a solution of 2,2'-bis(trifluoromethyl)-4,4'-dinitro-1,1'-biphenyl (1.9 g) in 5 ml of ethanol. Concentrated hydrochloric acid (12 ml) was added carefully to the mixture while stirring at room temperature. The mixture was refluxed overnight and the ethanol was removed. Water was added to the residue and it was made basic with 20% sodium hydroxide solution. The resulting white precipitate was collected by filtration, washed with water, dried and then extracted in a Soxhlet flask with acetone for four hours. Removal of acetone gave a white residue, 2,2'-bis(trifluoromethyl)-4,4'-diamino-1,1'-biphenyl,

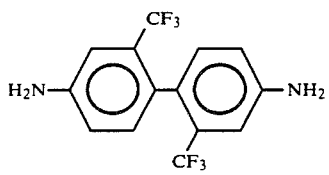

which was recrystallized from chloroform-hexane to give 1.2 g (74% yield) of short white needles, m.p. 185°–186° C.

$C_{14}H_{10}F_6N_2$ requires 52.50%C, 2.63%H, 8.75%N and 35.6%F. Elemental analysis found 52.74%C, 3.23%H, 8.67%N and 35.01%F.

The 2,2'-bis(trifluoromthyl)-4,4'-diamino-1,1'-biphenyl (18.16 g, 0.057 mole) and 3,4,9,10-perylenetetracarboxylic acid dianhydride (1.12 g, 2.8 mmole) were dissolved in 400 ml of freshly distilled N-methyl pyrrolidone (NMP) containing zinc acetate (300 mg) in a one liter, three neck round bottom flask fitted with a mechanical stirrer, condenser and nitrogen inlet. The solution was refluxed for ten hours. After cooling to room temperature, the solution was poured into water and the resulting precipitate collected on a fritted glass funnel. The precipitate was washed several times with water and then with ether. Flash chromatography on silica gel, collecting 250 ml fractions eluting with ethyl acetate (75 ml), 50% ethyl acetate/tetrahydrofuran (200 ml) and tetrahydrofuran (2000 ml) gave 1.39 g (50% yield) of compound I, a red solid, in fractions 15–21. The compound was found to be 98.6% pure by HPLC analysis.

The molecular structure was confirmed by infrared, ultraviolet and mass spectroscopy.

UV (THF) $\lambda max = 520$ nm, $\epsilon = 101,000$; 485 nm, $\epsilon = 61,800$; 455 nm, $\epsilon = 22,200$.

The dye was found to be soluble in organic solvents such as tetrahydrofuran, acetone, butanone, ethyl acetate, tetramethyl urea, N-methylpyrrolidone, dimethylacetamide, dimethylsulfoxide, dimethylformamide and acids such as sulfuric acid, hydrochloric acid and trifluoroacetic acid.

The dye was found to be soluble in liquid crystal materials E7, E63, PCH 1221, TN 570 and TN 653.

The order parameter of the dye in solution in various nematic liquid crystal materials was determined by the following procedure. A liqid crystal guest-host mixture was prepared with the amount of dye shown based on the weight of liquid crystal material. The formulation was placed in a homeotropic liquid crystal test cell made up of indium oxide coated glass plates separated by an 0.5 mil thick Mylar spacer. The order parameter was determined, as described above, by measuring the light absorption of the dye in the liquid crystal mixture with a polarizer arranged, respectively, parallel and perpendicular to the nematic director at 529 nm.

| LIQUID CRYSTAL | DYE (WT %) | ORDER PARAMETER |
|---|---|---|
| E7 | 0.2–0.3* | 0.71 |
| E63 | 0.24** | 0.76 |
| PCH 1221 | 0.2–0.3* | 0.69 |
| TN 653 | 0.38** | 0.74 |

*Approximated
**Measured

The application of an electrical field of about 3 kv/cm across the test cell resulted in the liquid crystal material changing from a red color to colorless.

EXAMPLE II

Compound II, a red solid, was prepared in accordance with the procedure described in Example I with the exception that 2,2'-dichloro, 4,4'-diamino-5,5'-dimethoxy 1,1'-biphenyl was reacted with the 3,4,9,10-perylenetetracarboxylic acid dianhydride.

The structure of the dye was confirmed by infrared and ultraviolet spectroscopy.

UV (THF) $\lambda max = 519$ nm, $\epsilon = 74,000$; 485 nm, $\epsilon = 46,000$; 455 nm, $\epsilon = 19,000$.

The dye was found to be soluble in various organic solvents such as dimethylsulfoxide, dimethylformamide, N-methylpyrrolidone, dimethylacetate, tetramethylurea and acids such as sulfuric acid.

The order parameter of the dye (0.05 weight percent) in E7 at 540 nm was 0.76.

Although the invention has been described with respect to specific preferred embodiments, it is not intended to be limited thereto but rather those skilled in the art will recognize that variations and modifications may be made therein which are within the spirit of the invention and the scope of the appended claims.

What is claimed is:

1. A liquid crystal composition comprising a liquid crystal material and at least one perylene dye represented by the formula

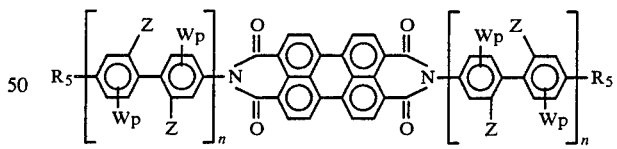

wherein W is hydrogen or a substituent other than hydrogen; Z is a substituent other than hydrogen; $R_5$ is hydrogen, halogen, alkyl having from 1 to 10 carbon atoms, alkoxy having from 1 to 10 carbon atoms, phenyl, cyano, nitro,

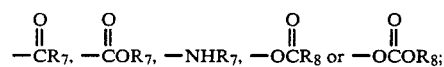

$R_7$ is hydrogen, alkyl having from 1 to 10 carbon atoms, phenyl or biphenyl; $R_8$ is alkyl having from 1 to 10 carbon atoms, phenyl or biphenyl; n is 1 or 2 and p is an integer of from 1 to 3; said W and Z substitution being sufficient to provide the biphenylene radicals to which they are attached with a non-coplanar molecular configuration.

2. The composition as defined in claim 1 wherein said liquid crystal material is nematic liquid crystal material.

3. The composition as defined in claim 2 wherein Z is —CF$_3$, W is hydrogen and p is 3.

4. The composition as defined in claim 3 wherein said perylene dye is represented by the formula

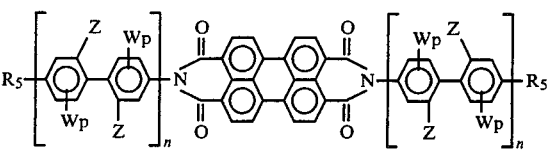

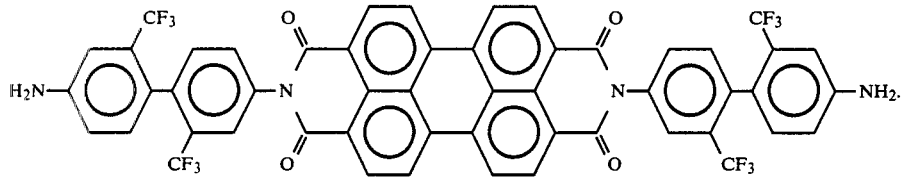

5. The composition as defined in claim 2 wherein Z is halogen, W is alkoxy having from 1 to 10 carbon atoms and p is 1.

6. The composition as defined in claim 5 wherein said perylene dye is represented by the formula

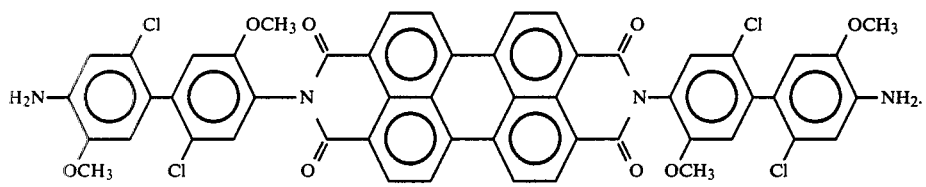

7. A liquid crystal display device comprising a layer of liquid crystal composition as defined in claim 1 and means for creating an image in said liquid crystal layer.

8. The display device as defined in claim 7 wherein said liquid crystal material is nematic liquid crystal material.

9. The display device as defined in claim 8 wherein Z is —CF$_3$, W is hydrogen and p is 3.

10. The display device as defined in claim 9 wherein said perylene dye is represented by the formula

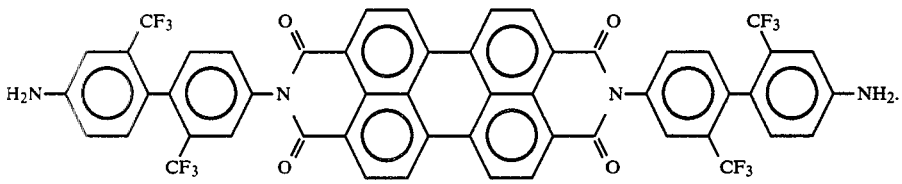

11. The display device as defined in claim 8 wherein Z is halogen, W is alkoxy having from 1 to 10 carbon atoms and p is 1.

12. The diplay device as defined in claim 11 wherein said perylene dye is represented by the formula

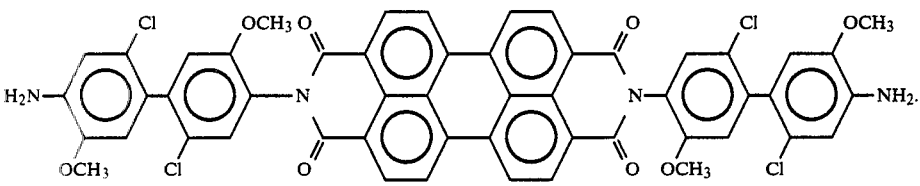

13. A perylene compound represented by the formula wherein W is hydrogen or a substituent other than hydrogen; Z is a substituent other than hydrogen; R$_5$ is hydrogen, halogen, alkyl having from 1 to 10 carbon atoms, alkoxy having from 1 to 10 carbon atoms, phenyl, cyano, nitro,

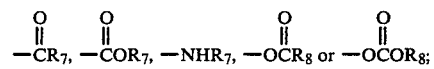

R$_7$ is hydrogen, alkyl having from 1 to 10 carbon atoms, phenyl or biphenyl; R$_8$ is alkyl having from 1 to 10 carbon atoms, phenyl or biphenyl; n is 1 or 2 and p is an integer of from 1 to 3; said W and Z substitution being sufficient to provide the biphenylene radicals to which they are attached with a non-coplanar molecular configuration.

14. The compound as defined in claim 13 wherein Z is —CF$_3$, W is hydrogen, p is 3 and n is 1.

15. The compound as defined in claim 13 wherein Z is halogen, W is alkoxy having from 1 to 10 carbon atoms, p is 1 and n is 1.

* * * * *